United States Patent
Oder

(10) Patent No.: US 6,460,508 B1
(45) Date of Patent: Oct. 8, 2002

(54) METHOD OF OPERATION FOR AN INTERNAL COMBUSTION ENGINE

(75) Inventor: Michael Oder, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,065

(22) PCT Filed: Mar. 22, 1999

(86) PCT No.: PCT/DE99/00808

§ 371 (c)(1),
(2), (4) Date: Sep. 26, 2000

(87) PCT Pub. No.: WO99/49196

PCT Pub. Date: Sep. 30, 1999

(30) Foreign Application Priority Data

Mar. 26, 1998 (DE) .......................................... 198 13 380

(51) Int. Cl.[7] .......................... F02D 37/02; F02D 41/40
(52) U.S. Cl. .............. 123/295; 123/406.23; 123/406.45
(58) Field of Search ........................... 123/295, 406.23, 123/305, 406.45–406.48

(56) References Cited

U.S. PATENT DOCUMENTS

| | | | | |
|---|---|---|---|---|
| 5,383,432 A | * | 1/1995 | Cullen et al. ................ | 123/406 |
| 5,722,362 A | | 3/1998 | Fujieda et al. ............... | 123/295 |
| 5,875,756 A | * | 3/1999 | Kamura et al. .............. | 123/295 |

FOREIGN PATENT DOCUMENTS

| | | | |
|---|---|---|---|
| EP | 0 826 880 | | 3/1998 |
| JP | 361187545 A | * | 8/1986 |
| JP | 08 189405 | | 11/1996 |
| WO | WO 98 09062 | | 3/1998 |

* cited by examiner

Primary Examiner—Gene Mancene
Assistant Examiner—Arnold Castro
(74) Attorney, Agent, or Firm—Walter Ottesen

(57) ABSTRACT

A method is described for operating an internal combustion engine (1) especially of a motor vehicle, wherein a lean air/fuel mixture is supplied to a combustion chamber (4) in a first mode of operation and a stoichiometric or a rich air/fuel mixture is supplied to the combustion chamber in a second mode of operation. This supplied air/fuel mixture is then ignited in the combustion chamber (4). The ignition time point or the ignition angle (ZW) for the ignition of the air/fuel mixture is shifted in the direction of retardation for a transition between the two modes of operation.

18 Claims, 2 Drawing Sheets

METHOD OF OPERATION FOR AN INTERNAL COMBUSTION ENGINE

FIELD OF THE INVENTION

The invention relates to a method for operating an internal combustion engine, especially of a motor vehicle, wherein a lean air/fuel mixture is supplied to a combustion chamber in a first mode of operation and wherein a stoichiometric or a rich air/fuel mixture is supplied in a second mode of operation. In the method, the supplied air/fuel mixture is combusted in the combustion chamber. The invention also relates to an internal combustion engine especially for a motor vehicle. A lean air/fuel mixture is supplied to a combustion chamber in a first mode of operation and a stoichiometric or a rich air/fuel mixture is supplied to the combustion chamber in a second mode of operation. The supplied air/fuel mixture is ignited in the combustion chamber and the engine has a control apparatus for controlling (open loop and/or closed loop) the two modes of operation.

BACKGROUND OF THE INVENTION

A method of this kind and an internal combustion engine of this kind are, for example, known from motor vehicles having gasoline injection into an intake manifold arranged forward of the combustion chamber. There, the engine is run in idle and at part load with a stoichiometric or lean air/fuel mixture to reduce the fuel consumption and the generation of exhaust gases containing toxic substances. If the driver of the motor vehicle desires an acceleration, then the engine is driven with a rich air/fuel mixture for such a full load in order to generate the required torque for the acceleration. The control (open loop and/or closed loop) of such a gasoline injection takes place via a throttle flap with which the air mass supplied to the combustion chamber is influenced as well as via an injection valve mounted in the intake manifold. The fuel mass injected into the intake manifold is influenced by the injection valve. The air/fuel mixture, which is supplied to the combustion chamber in this way, is ignited by a spark plug and the fuel is combusted. The torque generated by the engine results from the combustion of the fuel.

Especially because of the different modes of operation, it is possible that so-called jolting can occur during the operation of the engine.

SUMMARY OF THE INVENTION

It is an object of the invention to provide a method and an internal combustion engine, especially for a motor vehicle, which exhibit as little jolting as possible or no jolting.

This object or task is solved in a method of the above-described kind in accordance with the invention in that, in a transition between the two modes of operation, the ignition time point or the ignition angle is retarded for the ignition of the air/fuel mixture. In an internal combustion engine of the kind described initially herein, the task is solved in accordance with the invention in that the ignition time point or the ignition angle for the ignition of the fuel is retarded via the control apparatus for a transition between the two modes of operation.

The throttle flap of the engine is first closed for a transition, for example, from a lean air/fuel mixture to a stoichiometric or rich air/fuel mixture so that less air mass reaches the combustion chamber. The reduction of the air mass takes place with a time delay because of the storage action of the intake manifold arranged between the throttle flap and the combustion chamber. This has the consequence that too much air mass from the intake manifold reaches the combustion chamber approximately during this time delay after the closure of the throttle flap. The stoichiometric or rich air/fuel mixture which is wanted after the transition into the second mode of operation, is thereby disturbed which is noticed by a torque increase, that is, by a jolt.

The efficiency of the combustion in the combustion chamber is deteriorated by the ignition retard of the ignition time point or ignition angle. This has the consequence that the resulting torque increase is prevented or at least reduced.

For a transition from a stoichiometric or rich air/fuel mixture to a lean air/fuel mixture, the reverse is true and the throttle flap is first opened so that a larger air mass reaches the combustion chamber. However, here too, a time delay is present because of the intake manifold until the increased air mass, which is required for the second mode of operation, reaches the combustion chamber. Too large an air mass for the first mode of operation is present during this time delay which becomes manifest as a jolt when there is a torque increase.

Because of the retardation of the ignition time point or ignition angle in accordance with the invention, the efficiency of the combustion is again deteriorated so that the jolting is at least partially or even completely diminished.

Accordingly, the ignition retardation provides that the engine exhibits no jolting or virtually no jolting in the transition between the two modes of operation. The smooth running of the engine and therefore the comfort for the driver is thereby improved.

In an advantageous embodiment of the invention, the ignition time point or the ignition angle is retarded during a transition in such a manner that the torque, which is generated by the engine, remains approximately constant during the transition.

Accordingly, for a transition from a lean air/fuel mixture to a stoichiometric or rich air/fuel mixture, for example, the occurring torque increase is precisely so balanced and compensated by the ignition retardation according to the invention that no or virtually no change of the torque, which is generated by the engine, takes place during the transition. In this way, it is achieved that no jolting or virtually no jolting is present during the transition.

In an advantageous embodiment of the invention, when there is a transition from the first mode of operation into the second mode of operation, the ignition time point or ignition angle is retarded after the transition.

Directly after the transition to the stoichiometric or rich air/fuel mixture, there is still too much air present in the combustion chamber because of the already-mentioned storage action of the intake manifold. The torque increase resulting therefrom therefore results directly after the transition into the second mode of operation. With the retardation of the ignition time point or ignition angle taking place after the transition, the compensation of the torque increase takes place at the correct time, namely, directly after the engine has transferred into the second mode of operation.

In a further advantageous embodiment of the invention, for a transition from the second mode of operation into the first mode of operation, the ignition time point or the ignition angle is retarded in advance of the transition.

With the mentioned delaying action of the intake manifold, there is too much air already present in the combustion chamber in advance of the transition to the lean air/fuel mixture. The torque increase, which results therefrom, therefore takes place directly in advance of the transition into the first mode of operation. With the retardation of the ignition time point or ignition angle starting in advance of the transition, it is achieved that the compensation of the torque increase takes place at the correct time, namely directly before the engine goes over into the second mode of operation.

In an advantageous embodiment of the invention, the fuel mass is reduced when there is a transition between the two modes of operation.

A reduction of the generated torque and therefore a reduction of the torque increase during the transition between the first and second modes of operation can be achieved by the reduction of the fuel mass. In this way, a jolting of the engine can, if required, be completely or at least partially prevented by this reduction of the fuel mass. It is thereby possible to substitute the retardation of the ignition time point or ignition angle in accordance with the invention, if required, completely or at least partially with the reduction of the fuel mass.

Preferably, the reduction of the fuel mass takes place additionally to and approximately simultaneously with the retardation of the ignition time point or ignition angle. In this way, it is no longer necessary to compensate the entire torque increase by the retardation so that, in comparison to a compensation without a reduction of the fuel mass, a lesser retardation is sufficient. This affords the advantage that an error in the computation of the retardation of the ignition time point or the ignition angle has a lesser effect on the efficiency of the combustion and therefore on the compensation of the torque increase.

An especially advantageous embodiment of the invention provides that the fuel is injected directly into the combustion chamber of the engine during a compression phase in the first mode of operation.

It is then further advantageous when the fuel is injected directly into the combustion chamber during an induction phase in the second mode of operation.

Accordingly, the above-mentioned especially advantageous embodiment of the invention is a so-called gasoline direct injection wherein the fuel is injected in each case directly into the combustion chamber of the engine with an injection valve in contrast to the previous intake manifold injection of the fuel. To reduce the fuel consumption and the generation of exhaust gases which contain toxic substances, a lean air/fuel mixture is achieved in the first mode of operation in that the fuel is injected into the combustion chamber in the compression phase of the engine. This first mode of operation is also called stratified operation or stratified charge operation. In the second mode of operation (as in the intake manifold injection), the fuel is injected into the combustion chamber during the induction phase. This can be a stoichiometric or rich air/fuel mixture with which especially the required torque is generated, for example, for an acceleration of the vehicle. This second mode of operation is also called homogeneous operation.

In the gasoline direct injection described, it is especially advantageous when there is a switchover between the two modes of operation especially via a control apparatus. The switchovers take place in dependence especially upon the driver command and the operating variables or state parameters of the engine.

With the application of the retardation of the ignition time point or ignition angle in accordance with the invention on the gasoline direct injection, it is achieved that no jolting or at least virtually no jolting is present in the there present switchovers from the stratified operation into the homogeneous operation and vice versa. The invention thereby effects an improved smooth running of the engine and thereby an improved comfort for the driver of the motor vehicle.

The realization of the method of the invention in the form of a control element is of special significance and this control element is provided for a control apparatus of an engine, especially of a motor vehicle. A program is stored on the control element which can be run on a computing apparatus and especially on a microprocessor and is suitable for carrying out the method according to the invention. In this case, the invention is therefore realized by a program stored on the control element so that the control element provided with the program defines the invention in the same way as the method for which the program is suitable for carrying out. As a control element, especially an electrical storage medium can be used, for example, a read-only-memory.

Additional features, application possibilities and advantages of the invention will become apparent from the subsequent description of the embodiments of the invention which are shown in the drawing. Here, all described or illustrated features define for themselves or in any desired combination, the subject matter of the invention independently of their description in the patent claims or their reference as well as independently of their formulation or illustration in the description or in the drawing.

Description of the Preferred Embodiments of the Invention

Figure 1:
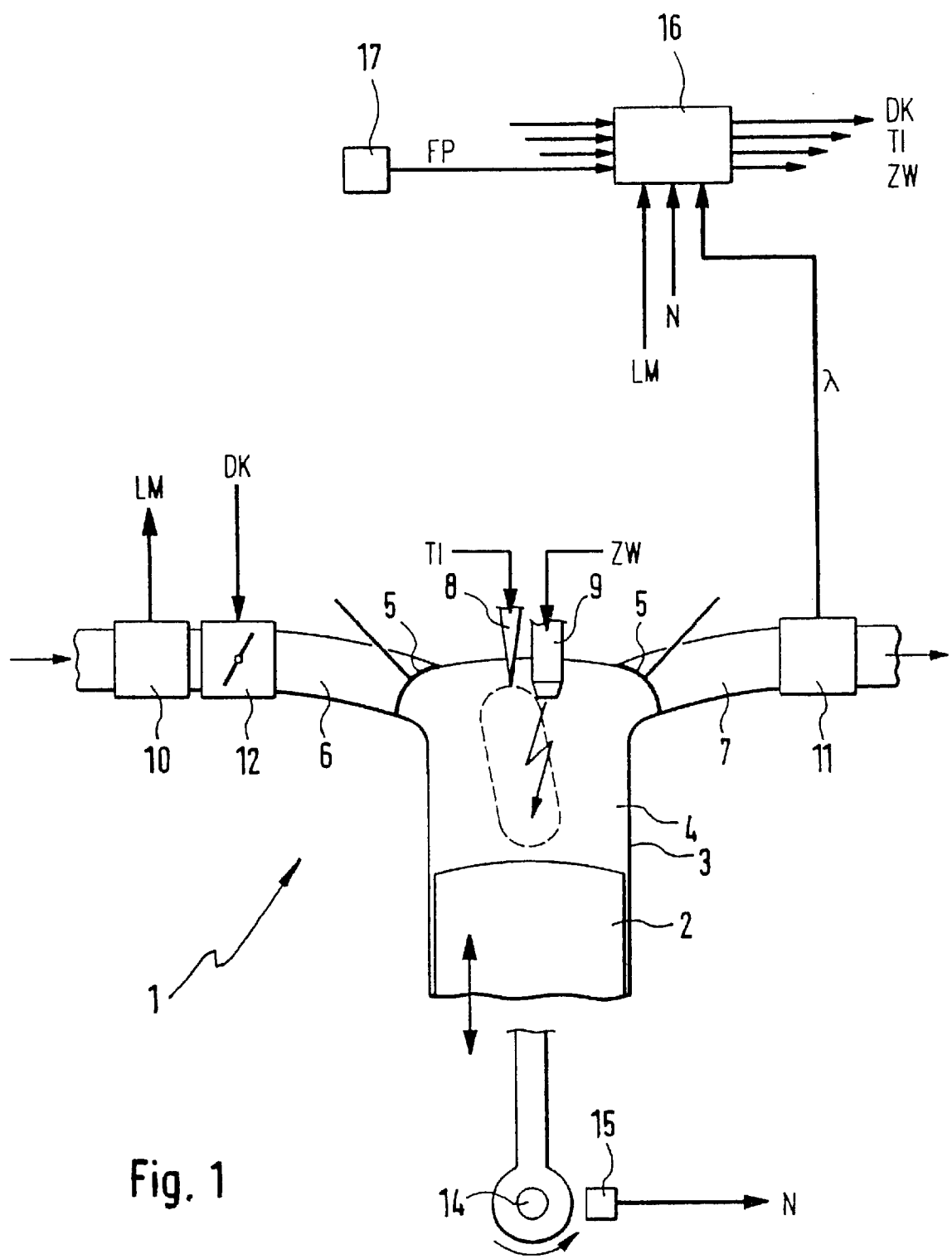
FIG. 1 is a schematic block circuit diagram of an embodiment of an internal combustion engine according to the invention for a motor vehicle; and, FIG. 2 is schematic sequence diagram of an embodiment of the method of the invention for operating the engine of FIG. 1.

In FIG. 1, an internal combustion engine 1 having gasoline direct injection is shown wherein a piston 2 can be moved back and forth in a cylinder 3. The cylinder 3 is provided with a combustion chamber 4 to which an intake manifold 6 and an exhaust-gas pipe 7 are connected via respective valves 5. Furthermore, an injection valve 8 and a spark plug 9 are assigned to the combustion chamber 4. The injection valve 8 is driven by the signal TI and the spark plug 9 is driven by a signal ZW.

The intake manifold 6 is provided with an air-mass sensor 10 and the exhaust-gas pipe 7 is provided with a lambda sensor 11. The air-mass sensor 10 measures the air mass of the fresh air supplied to the intake manifold 6 and generates a signal LM dependent thereon. The lambda sensor 11 measures the oxygen content of the exhaust gas-in the exhaust-gas pipe 7 and generates a signal $\lambda$ in dependence thereon.

A throttle flap 12 is mounted in the intake manifold 6 and the rotational position of the throttle flap can be adjusted by the signal DK.

In a first mode of operation, the stratified operation of the engine 1, the throttle flap 12 is opened wide. The fuel is injected into the combustion chamber 4 by the injection valve 8 during a compression phase caused by the piston 2 and injected spatially in the direct vicinity of the spark plug 9 as well as at a suitable spacing in time ahead of the ignition time point. Then, with the aid of the spark plug 9, the fuel is ignited so that the piston 2 is driven in the following work phase by the expansion of the ignited fuel.

In a second mode of operation, the homogeneous operation of the engine 1, the throttle flap 12 is opened partially or closed in dependence upon the wanted supplied air mass. The fuel is injected by the injection valve 8 into the combustion chamber 4 during an induction phase caused by the piston 2. The injected fuel is swirled by the simultaneously inducted air and is thereby distributed essentially uniformly in the combustion chamber 4. Thereafter, the air/fuel mixture is compressed during the compression phase in order to then be ignited by the spark plug 9. The piston 2 is driven with the expansion of the ignited fuel.

In stratified operation as also in homogeneous operation, a rotational movement is imparted by the driven piston to a crankshaft via which the wheels of the vehicle are driven. An rpm sensor 15 is assigned to the crankshaft 14 and generates a signal N in dependence upon the rotational movement of the crankshaft 14.

The fuel mass, which is injected into the combustion chamber 4 by the injection valve 8 in stratified operation and in homogeneous operation, is controlled (open loop and/or closed loop) especially with respect to a reduced fuel consumption and/or a reduced development of toxic substances. For this purpose, the control apparatus 16 is provided with a computing apparatus, especially a microprocessor, which has a program stored in a control element which is suitable to carry out the above-mentioned control (open loop and/or closed loop). The program is stored especially in a memory component, for example, a read-only-memory.

Input signals are applied to the control apparatus 16 and these input signals define operating variables of the engine measured by means of sensors. For example, the control apparatus 16 is connected to the air-mass sensor 10, the lambda sensor 11 and the rpm sensor 15. Furthermore, the control apparatus 16 is connected to an accelerator pedal sensor 17 which generates a signal FP which gives the position of an accelerator pedal actuated by the driver. The control apparatus generates output signals with which, via actuators, the performance of the engine can be influenced in correspondence to the wanted control (open loop and/or closed loop). For example, the control apparatus 16 is connected to the injection valve 8, the spark plug 9 and the throttle flap 12 and generates the signals TI, ZW and DK which are needed to drive the latter.

Figure 2:
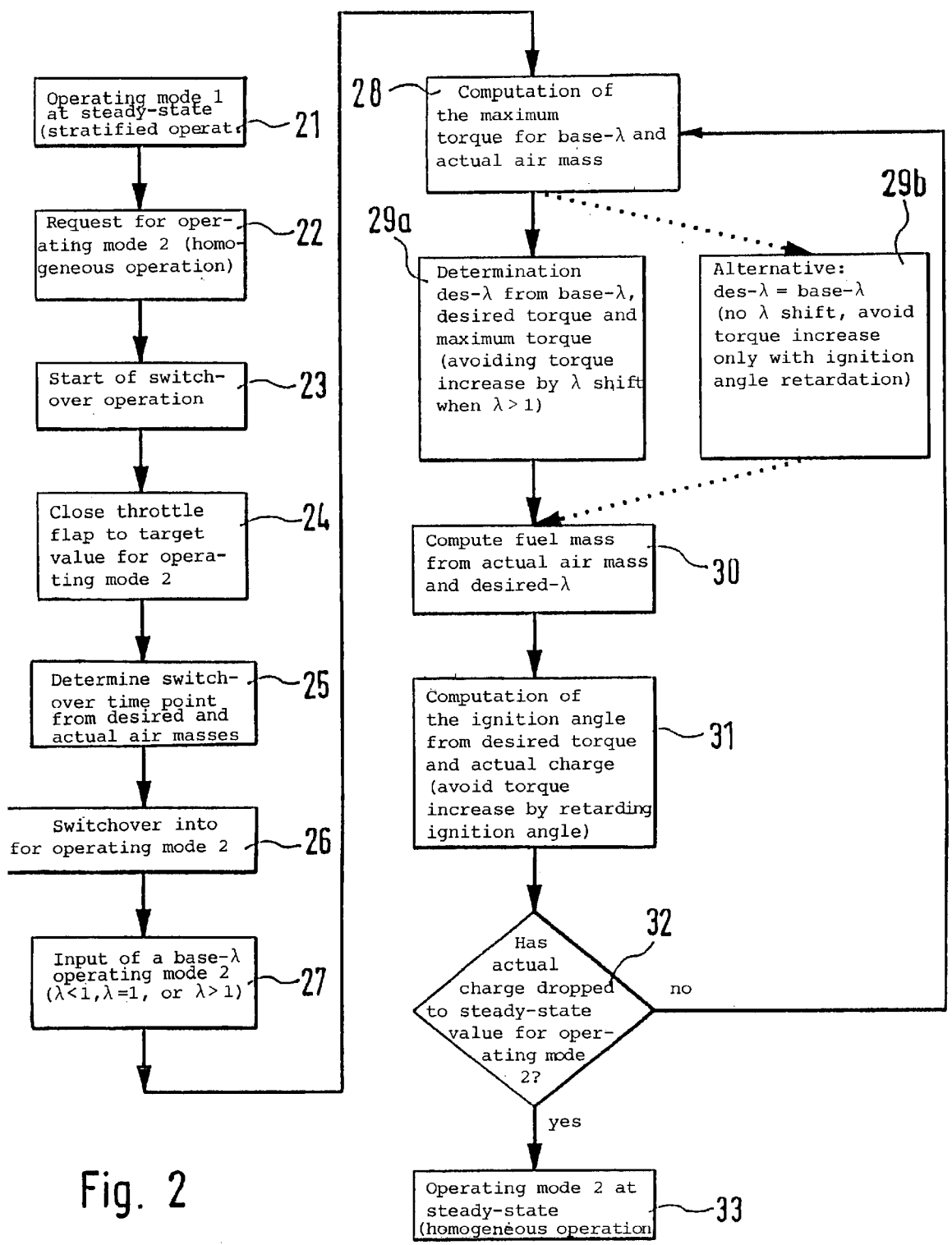

The method for switching over from a stratified operation into a homogeneous operation, which is described below with respect to FIG. 2, is carried out by the control apparatus 16. The blocks 21 to 33, which are shown in FIG. 2, define functions of the method which, for example, are realized in the form of software modules or the like in the control apparatus 16.

According to the block 21, the engine 1 is at steady state in the first mode of operation, that is, in the stratified operation wherein a lean air/fuel mixture is injected into the combustion chamber 4.

For example, because of an acceleration wanted by the driver of the motor vehicle, a command for the second mode of operation takes place in block 22, that is, the homogeneous operation wherein a stoichiometric or rich air/fuel mixture is injected into the combustion chamber 4. The switchover from the first mode of operation into the second mode of operation (that is, from stratified operation into the homogeneous operation) is started in block 23.

First, the throttle flap 12 is closed in block 24. This is achieved by the control apparatus 16 via the generation of a corresponding signal DK with which the throttle flap 12 is adjusted to a rotational position which corresponds to the target value for the requested homogeneous operation. The target value is computed by the control apparatus 16 in dependence upon the operating variables of the engine 1, for example, in dependence upon the engine speed N, the position of the accelerator pedal FP and the like.

Because of the storage action of the intake manifold 6, which is arranged between the throttle flap 12 and the combustion chamber 4, the air mass supplied to the combustion chamber 4 is not immediately reduced; instead, the air mass diminishes slowly during a time delay. For a portion of this time delay, the engine 1 continues to be operated in the first operating mode, that is, in stratified operation. Thereafter, a switchover takes place into the homogeneous operation. However, here there is no waiting until the time delay has completely run, that is, until the air mass, which is required for the commanded homogeneous operation, is supplied to the combustion chamber 4; instead, a switchover into homogeneous operation takes place earlier.

In block 25, that time point is computed by the control apparatus 16 at which the actual switchover from the first mode of operation into the second mode of operation should take place, that is, from the stratified operation into the homogeneous operation. This time point is determined on the basis of the desired air mass, which is required for the commanded homogeneous operation, and the currently measured actual air mass. The actual air mass is derived by the control apparatus 16 from the signal LM.

The switchover time point is computed in block 25 and the control apparatus 16 then switches over at the switchover time point in accordance with block 26 from the first operating mode, the stratified operation, into the second operating mode, the homogeneous operation.

In block 27, a base-$\lambda$ is given for the homogeneous operation by the control apparatus 16 and this base-$\lambda$ is computed on the basis of operating variables of the engine 1. The base-$\lambda$ can be equal to, greater than or less than 1.

In block 28, the control apparatus 16 computes from the base-$\lambda$ and the actual air mass a maximum torque of the engine 1 which results therefrom. The actual air mass is then again computed by the control apparatus 16 from the signal LM. The actual air mass is too large immediately after the switchover time point because of the storage action of the intake manifold 6 as explained. For this reason, the maximum torque, which results from this actual air mass, is likewise too great for the commanded homogeneous operation.

Now, a desired torque is computed by the control apparatus 16 in block 29*a* and this desired torque should be present in the second mode of operation, that is, in homogeneous operation. This desired torque is less than the maximum torque. The control apparatus 16 then determines a desired-$\lambda$ from the desired torque, the maximum torque and the base-$\lambda$. The desired-$\lambda$ is that $\lambda$ which is necessary in order to obtain the computed desired torque in the homogeneous operation.

The maximum torque is, as mentioned, really too large for the commanded homogeneous operation. This would have the consequence that the engine 1 would be exposed to a torque increase and therefore jolting. The desired torque is the required torque for the commanded homogeneous operation. Accordingly, no jolting or the like occurs with the desired torque. From the computation of the desired torque, that particular torque is known, with which a jolt-free transition is possible from the first mode of operation, the stratified operation, into the second mode of operation, the homogeneous operation.

In block 30, the control apparatus 16 computes the fuel mass, which is to be injected, from the determined desired-λ and the measured actual air mass. This fuel mass, which is to be injected, is injected into the combustion chamber 4 by the control apparatus 16 via the signal TI and the injection valve 8.

Thereafter, in block 31, the actual charge in the combustion chamber 4 is computed by the control apparatus 16. The actual charge is that particular air/fuel mixture which is actually supplied to the combustion chamber 4. The actual charge results from model computations on the basis of the operating variables of the engine 1. Alternatively or additively, it is possible to determine the actual charge with the aid of a pressure sensor in the intake manifold 6.

The control apparatus then computes the ignition angle ZW or an ignition time point in block 31 from the actual charge and the above-mentioned desired torque. This computation is designed to select the ignition angle ZW or the ignition time point in such a manner that the desired torque results from the actual charge.

The actual charge because of the already-mentioned storage action of the intake manifold 6 is still too great at least directly after the switchover time point. For this reason, this would cause a torque, which is too large, and therefore the above-mentioned torque increase for an ignition of the air/fuel mixture in correspondence to the homogeneous operation. The control apparatus 16 therefore shifts the ignition time point or the ignition angle ZW in such a manner that the efficiency of the combustion is deteriorated. This is achieved by a retardation of the ignition angle ZW or of the ignition time point. The engine 1 thereupon generates a lower torque so that the torque increase is entirely or at least partially compensated and therefore avoided. With the shift of the ignition angle ZW or the ignition time point in the direction of retardation, a jolt-free transition from the stratified operation into the homogeneous operation (that is, from the first mode of operation into the second mode of operation) is thereby obtained.

In block 32, the control apparatus 16 now checks whether the actual charge in the combustion chamber 4 has dropped to the value required for the commanded homogeneous operation. Accordingly, a check is made as to whether the air mass, which is supplied to the combustion chamber 4, has dropped to that value which is required for carrying out the wanted homogeneous operation.

If this is not the case, then the method is continued by the control apparatus 16 with block 28. Accordingly, the maximum torque, the desired-λ, the fuel mass and the ignition angle ZW are computed anew on the basis of the now present operating variables of the engine 1. This leads again to a retardation of the ignition time point or the ignition angle ZW so that a torque increase and therefore a jolt is avoided.

This method is continued so long until the actual charge has dropped to that particular value which is required for the second mode of operation, that is, the homogeneous operation. This is approximately the case after the time delay generated by the storage action of the intake manifold 6. Then, a transfer is made to block 33 wherein the engine 1 is operated at steady state in the homogeneous mode by the control apparatus 16.

Alternatively, it is possible to execute the block 29b in lieu of block 29a.

In this alternative, the desired-λ is always set equal to the base-λ. In this way, no new computation of λ takes place on the basis of the desired torque and the maximum torque in contrast to block 29a; instead, the λ is held constant and therefore not shifted during the entire method, that is, during the switchover.

In this case, the total compensation of the above-mentioned torque increase is achieved exclusively via the retardation of the ignition angle ZW or of the ignition time point.

With a switchover from the second mode of operation, that is, from a homogeneous operation, to the first mode of operation, that is, into a stratified operation, the throttle flap 12 is first opened by the control apparatus 16 so that more air mass reaches the combustion chamber 4. However, here too, a time delay is present because of the intake manifold 6 until the increased air mass, which is required for the second mode of operation, reaches the combustion chamber 4. During this time delay, an air mass is present which is too large for the first operating mode which would make itself manifest with a torque increase, that is, with a jolt.

Already too large an air mass is present in the combustion chamber 4 because of the above-mentioned delaying action of the intake manifold 6 ahead of the actual switchover into the stratified operation. This means that the homogeneous operation is already supplied with too large an air mass. The torque increase, which results therefrom, thereby takes place directly ahead of the switchover into the first mode of operation. The described retardation of the ignition angle ZW or the ignition time point therefore takes place directly ahead of the switchover from the homogeneous operation into the stratified operation. With the retardation of the ignition time point or ignition angle ZW occurring before the switchover, the efficiency of the combustion is deteriorated so that the jolt action is at least partially or even completely diminished.

What is claimed is:

1. A method for operating an internal combustion engine of a motor vehicle wherein a lean air/fuel mixture is supplied to a combustion chamber in a first mode of operation and a stoichiometric or a rich air/fuel mixture is supplied to the combustion chamber in a second mode of operation with the air/fuel mixture being ignited in the combustion chamber, the method comprising the steps of:

reducing the air mass supplied to said combustion chamber when there is a transition from said first mode of operation into said second mode of operation;

transferring into said second mode of operation before the air mass supplied to said combustion chamber corresponds to the air mass required for said second mode of operation; and, after the transfer into said second mode of operation, retarding the ignition time point or ignition angle (ZW) for igniting the air/fuel mixture as a function of the air/fuel mixture actually supplied to the combustion chamber and as a function of a desired torque required for a jolt free transition between said modes of operation.

2. The method of claim 1, wherein the fuel mass is reduced for a transition between the two modes of operation.

3. The method of claim 2, wherein the reduction of the fuel mass takes place in addition to and approximately simultaneously with the shift of the ignition time point or the ignition angle (ZW) in the direction of retardation.

4. The method of claim 1, wherein, in the first mode of operation, the fuel is injected directly into the combustion chamber of the engine during a compression phase.

5. The method of claim 4, wherein, in the second mode of operation, the fuel is injected directly into the combustion chamber during an induction phase.

6. The method of claim 5, wherein a switchover takes place between the two modes of operation.

7. A method for operating an internal combustion engine of a motor vehicle wherein a lean air/fuel mixture is supplied to a combustion chamber in a first mode of operation and a stoichiometric or a rich air/fuel mixture is supplied to the combustion chamber in a second mode of operation with the air/fuel mixture being ignited in the combustion chamber, the method comprising the steps of:
  increasing the air mass supplied to said combustion chamber when there is a transition from said second mode of operation into said first mode of operation;
  transferring into said first mode of operation before the air mass supplied to said combustion chamber corresponds to the air mass required for said first mode of operation; and,
  before the transfer into said first mode of operation, retarding the ignition time point or ignition angle (ZW) for igniting the air/fuel mixture as a function of the air/fuel mixture actually supplied to the combustion chamber and as a function of a desired torque required for a jolt free transition between said modes of operation.

8. The method of claim 7, wherein the fuel mass is reduced for a transition between the two modes of operation.

9. The method of claim 8, wherein the reduction of the fuel mass takes place in addition to and approximately simultaneously with the shift of the ignition time point or the ignition angle (ZW) in the direction of retardation.

10. The method of claim 7, wherein, in the first mode of operation, the fuel is injected directly into the combustion chamber of the engine during a compression phase.

11. The method of claim 10, wherein, in the second mode of operation, the fuel is injected directly into the combustion chamber during an induction phase.

12. The method of claim 11, wherein a switchover takes place between the two modes of operation.

13. A program carrying out a method for operating an internal combustion engine of a motor vehicle wherein a lean air/fuel mixture is supplied to a combustion chamber in a first mode of operation and a stoichiometric or a rich air/fuel mixture is supplied to the combustion chamber in a second mode of operation with the air/fuel mixture being ignited in the combustion chamber, and, when the program is configured on a control apparatus, said program being suitable for carrying out the method comprising the steps of:
  reducing the air mass supplied to said combustion chamber when there is a transition from said first mode of operation into said second mode of operation;
  transferring into said second mode of operation before the air mass supplied to said combustion chamber corresponds to the air mass required for said second mode of operation; and,
  after the transfer into said second mode of operation, retarding the ignition time point or ignition angle (ZW) for igniting the air/fuel mixture as a function of the air/fuel mixture actually supplied to the combustion chamber and as a function of a desired torque required for a jolt free transition between said modes of operation.

14. The program of claim 13, wherein said program is stored in a memory.

15. A program carrying out a method for operating an internal combustion engine of a motor vehicle wherein a lean air/fuel mixture is supplied to a combustion chamber in a first mode of operation and a stoichiometric or a rich air/fuel mixture is supplied to the combustion chamber in a second mode of operation with the air/fuel mixture being ignited in the combustion chamber, and, when the program is configured on a control apparatus, said program being suitable for carrying out the method comprising the steps of:
  increasing the air mass supplied to said combustion chamber when there is a transition from said second mode of operation into said first mode of operation;
  transferring into said first mode of operation before the air mass supplied to said combustion chamber corresponds to the air mass required for said first mode of operation; and,
  before the transfer into said first mode of operation, retarding the ignition time point or ignition angle (ZW) for igniting the air/fuel mixture as a function of the air/fuel mixture actually supplied to the combustion chamber and as a function of a desired torque required for a jolt free transition between said modes of operation.

16. The program of claim 15, wherein said program is stored in a memory.

17. An internal combustion engine including an engine for a motor vehicle, wherein a lean air/fuel mixture is supplied to a combustion chamber in a first mode of operation and a stoichiometric or a rich air/fuel mixture is supplied to the combustion chamber in a second mode of operation; and, wherein the supplied air/fuel mixture can be ignited in the combustion chamber; and, the engine comprising:
  a control apparatus for controlling (open loop and/or closed loop) the two modes of operation; and,
  said control apparatus functioning to carry out the following method steps:
    reducing the air mass supplied to said combustion chamber when there is a transition from said first mode of operation into said second mode of operation;
    transferring into said second mode of operation before the air mass supplied to said combustion chamber corresponds to the air mass required for said second mode of operation; and,
    after the transfer into said second mode of operation, retarding the ignition time point or ignition angle (ZW) for igniting the air/fuel mixture as a function of the air/fuel mixture actually supplied to the combustion chamber and as a function of a desired torque required for a jolt free transition between said modes of operation.

18. An internal combustion engine including an engine for a motor vehicle, wherein a lean air/fuel mixture is supplied to a combustion chamber in a first mode of operation and a stoichiometric or a rich air/fuel mixture is supplied to the combustion chamber in a second mode of operation; and, wherein the supplied air/fuel mixture can be ignited in the combustion chamber; and, the engine comprising:
  a control apparatus for controlling (open loop and/or closed loop) the two modes of operation; and,
  said control apparatus functioning to carry out the following method steps:
    increasing the air mass supplied to said combustion chamber when there is a transition from said second mode of operation into said first mode of operation;
    transferring into said first mode of operation before the air mass supplied to said combustion chamber corresponds to the air mass required for said first mode of operation; and, before the transfer into said first mode of operation, retarding the ignition time point or ignition angle (ZW) for igniting the air/fuel mixture as a function of the air/fuel mixture actually supplied to the combustion chamber and as a function of a desired torque required for a jolt free transition between said modes of operation.

* * * * *